US011232078B2

(12) United States Patent
Fitzer et al.

(10) Patent No.: US 11,232,078 B2
(45) Date of Patent: Jan. 25, 2022

(54) MULTITENANCY USING AN OVERLAY FILE SYSTEM

(71) Applicant: SAP SE, Walldorf (DE)

(72) Inventors: Joachim Fitzer, Schriesheim (DE); Pietro Francesco Menna, Sao Leopoldo (BR); Felipe Musse, Porto Alegre (BR); Simon Seif, Ostringen (DE)

(73) Assignee: SAP SE, Walldorf (DE)

( * ) Notice: Subject to any disclaimer, the term of this patent is extended or adjusted under 35 U.S.C. 154(b) by 362 days.

(21) Appl. No.: 16/376,277

(22) Filed: Apr. 5, 2019

(65) Prior Publication Data

US 2020/0320041 A1     Oct. 8, 2020

(51) Int. Cl.
*G06F 16/176* (2019.01)
*G06F 16/182* (2019.01)

(52) U.S. Cl.
CPC ........ *G06F 16/1767* (2019.01); *G06F 16/183* (2019.01)

(58) Field of Classification Search
CPC .. G06F 16/1767; G06F 16/183; G06F 16/176; G06F 21/6218
See application file for complete search history.

(56) References Cited

U.S. PATENT DOCUMENTS

| 6,356,915 B1 | 3/2002 | Chtchetkine et al. |
|---|---|---|
| 7,620,948 B1 | 11/2009 | Rowe et al. |
| 7,636,722 B2 | 12/2009 | Bunker et al. |
| 7,769,794 B2 | 8/2010 | Moore et al. |
| 9,766,881 B2 | 9/2017 | Wong |
| 10,169,347 B2 | 1/2019 | Jayachandran et al. |
| 10,809,994 B1 | 10/2020 | Fitzer et al. |
| 10,866,938 B2 | 12/2020 | Gupta |
| 10,942,723 B2 | 3/2021 | Fitzer et al. |
| 10,956,140 B2 | 3/2021 | Fitzer et al. |
| 2004/0064589 A1 | 4/2004 | Boucher et al. |
| 2004/0064590 A1 | 4/2004 | Starr et al. |
| 2004/0189707 A1 | 9/2004 | Moore et al. |
| 2004/0193594 A1 | 9/2004 | Moore et al. |
| 2004/0193621 A1 | 9/2004 | Moore et al. |
| 2004/0193672 A1 | 9/2004 | Samji et al. |

(Continued)

OTHER PUBLICATIONS

Venkatesh, Sunil. Dynamically reconfigurable layered filesystem, (2012), University of Maryland, Baltimore County (Year: 2012).*

(Continued)

*Primary Examiner* — Matthew Ell
*Assistant Examiner* — Lana Alagic
(74) *Attorney, Agent, or Firm* — Schwegman Lundberg & Woessner, P.A.

(57) ABSTRACT

Example methods and systems are directed to multitenancy using an overlay file system. Each tenant has one or more users and a tenant layer in the overlay file system. Each user has a user layer in the overlay file system. The overlay file system provides a logical file system to each user based on the user layer, the tenant layer, and a strategy comprising a set of application layers. A first user shares a file with other users of the same tenant by moving the file from the first user's user layer to the tenant layer. After the file is moved, all users of the tenant have access to the file. The moving of the file is achieved by modifying metadata for the file.

20 Claims, 10 Drawing Sheets

(56) References Cited

U.S. PATENT DOCUMENTS

| | | | |
|---|---|---|---|
| 2004/0193673 A1 | 9/2004 | Samji et al. | |
| 2004/0204941 A1 | 10/2004 | Israch et al. | |
| 2004/0230599 A1 | 11/2004 | Moore et al. | |
| 2005/0246331 A1 | 11/2005 | De Vorchik et al. | |
| 2006/0036568 A1 | 2/2006 | Moore et al. | |
| 2007/0067349 A1 | 3/2007 | Jhaveri et al. | |
| 2007/0067497 A1 | 3/2007 | Craft et al. | |
| 2007/0245257 A1 | 10/2007 | Chan et al. | |
| 2009/0157627 A1 | 6/2009 | Arthursson | |
| 2009/0305778 A1 | 12/2009 | Yu et al. | |
| 2011/0119634 A1 | 5/2011 | Bhatt et al. | |
| 2012/0011562 A1* | 1/2012 | Slater | G06F 16/176 726/1 |
| 2012/0047139 A1* | 2/2012 | Fitzer | G06F 16/252 707/737 |
| 2012/0110328 A1 | 5/2012 | Pate et al. | |
| 2012/0166488 A1 | 6/2012 | Kaushik et al. | |
| 2012/0198559 A1 | 8/2012 | Venkata | |
| 2014/0074782 A1 | 3/2014 | Green et al. | |
| 2014/0248002 A1 | 9/2014 | Thakkar et al. | |
| 2015/0128105 A1 | 5/2015 | Sethi et al. | |
| 2015/0261774 A1 | 9/2015 | Mcferrin et al. | |
| 2015/0261782 A1 | 9/2015 | Mcferrin et al. | |
| 2015/0261971 A1 | 9/2015 | Mcferrin et al. | |
| 2015/0268948 A1 | 9/2015 | Plate | |
| 2016/0261684 A1 | 9/2016 | Khalaf et al. | |
| 2016/0378348 A1 | 12/2016 | Uriel | |
| 2016/0378676 A1 | 12/2016 | Uriel | |
| 2017/0048079 A1 | 2/2017 | Nethi et al. | |
| 2017/0075675 A1 | 3/2017 | Babol et al. | |
| 2017/0078094 A1 | 3/2017 | Olson | |
| 2017/0206071 A1 | 7/2017 | Kirkpatrick | |
| 2017/0344292 A1 | 11/2017 | Sterin et al. | |
| 2017/0364342 A1 | 12/2017 | Shuster et al. | |
| 2018/0027006 A1 | 1/2018 | Zimmermann et al. | |
| 2018/0027070 A1 | 1/2018 | Jhanji et al. | |
| 2018/0129479 A1 | 5/2018 | Mcpherson et al. | |
| 2018/0129803 A1 | 5/2018 | Levin et al. | |
| 2018/0189121 A1 | 7/2018 | Jobi et al. | |
| 2018/0196654 A1 | 7/2018 | Bo et al. | |
| 2018/0211029 A1 | 7/2018 | Ryu et al. | |
| 2018/0293066 A1 | 10/2018 | Ali et al. | |
| 2018/0295059 A1 | 10/2018 | Gamage | |
| 2018/0341471 A1 | 11/2018 | Stefanov et al. | |
| 2018/0351870 A1* | 12/2018 | Chen | G06F 16/14 |
| 2018/0356964 A1 | 12/2018 | Morris | |
| 2018/0357068 A1 | 12/2018 | Ambichl et al. | |
| 2019/0004779 A1 | 1/2019 | Schmidt et al. | |
| 2019/0026474 A1 | 1/2019 | Adam et al. | |
| 2019/0042286 A1 | 2/2019 | Bailey et al. | |
| 2019/0095179 A1 | 3/2019 | Straub | |
| 2019/0146830 A1 | 5/2019 | Gerber et al. | |
| 2019/0173949 A1 | 6/2019 | Inomata et al. | |
| 2019/0205289 A1* | 7/2019 | Kleinpeter | G06F 16/9027 |
| 2019/0227794 A1 | 7/2019 | Mercille et al. | |
| 2019/0235900 A1 | 8/2019 | Singh et al. | |
| 2019/0272224 A1 | 9/2019 | Woods | |
| 2019/0324786 A1 | 10/2019 | Ranjan et al. | |
| 2019/0349402 A1 | 11/2019 | Shukla et al. | |
| 2020/0019410 A1 | 1/2020 | Dima et al. | |
| 2020/0034170 A1 | 1/2020 | Chen et al. | |
| 2020/0034745 A1 | 1/2020 | Nagpal et al. | |
| 2020/0104385 A1 | 4/2020 | Zheng et al. | |
| 2020/0319869 A1 | 10/2020 | Fitzer et al. | |
| 2020/0319870 A1 | 10/2020 | Fitzer et al. | |
| 2020/0319871 A1 | 10/2020 | Fitzer et al. | |
| 2020/0320042 A1 | 10/2020 | Fitzer et al. | |
| 2021/0149657 A1 | 5/2021 | Fitzer et al. | |

OTHER PUBLICATIONS

"U.S. Appl. No. 16/376,408, Notice of Allowance dated Aug. 3, 2020".

Heiner, Andreas P., "Secure Software Installation in a Mobile Environment", (Jul. 18-20, 2007), pp. 155-156.

"U.S. Appl. No. 16/376,305, Non Final Office Action dated Feb. 21, 2020".

Brown, Nigel, "The Overlay File System", [Online], Retrieved from the Internet: <URL: https://windsock.io/the-overlay-filesystem/>, (May 22, 2015), 5 pgs.

"U.S. Appl. No. 16/376,305, Response filed Apr. 24, 2020 to Non Final Office Action dated Feb. 21, 2020", 10 pgs.

"U.S. Appl. No. 16/376,408, Non Final Office Action dated Apr. 29, 2020", 12 pgs.

"U.S. Appl. No. 16/376,408, Response filed May 28, 2020 to Non Final Office Action dated Apr. 29, 2020", 11 pgs.

"U.S. Appl. No. 16/376,453, Non Final Office Action dated Apr. 30, 2020", 16 pgs.

"U.S. Appl. No. 16/376,453, Response filed May 27, 2020 to Non Final Office Action dated Apr. 30, 2020", 9 pgs.

"U.S. Appl. No. 16/376,408, Examiner Interview Summary dated Jun. 2, 2020", 4 pgs.

"U.S. Appl. No. 16/376,453, Examiner Interview Summary dated Jun. 2, 2020", 3 pgs.

"U.S. Appl. No. 16/376,305, Examiner Interview Summary dated Jun. 4, 2020", 3 pgs.

"U.S. Appl. No. 16/376,305, Notice of Allowance dated Jun. 30, 2020", 7 pgs.

U.S. Appl. 17/162,529, filed Jan. 29, 2021, Software Installation Through an Overlay File System.

U.S. Appl. No. 17/369,059, filed Jul. 7, 2021, Multitenant Application Server Using a Union File System.

"U.S. Appl. No. 16/376,305, Notice of Allowance dated Nov. 24, 2020", 8 pgs.

"U.S. Appl. No. 16/376,351, Corrected Notice of Allowability dated Aug. 11, 2021", 2 pgs.

"U.S. Appl. No. 16/376,351, Examiner Interview Summary dated May 26, 2021", 2 pgs.

"U.S. Appl. No. 16/376,351, Non Final Office Action dated Mar. 29, 2021", 10 pgs.

"U.S. Appl. No. 16/376,351, Notice of Allowance dated Jun. 16, 2021", 8 pgs.

"U.S. Appl. No. 16/376,351, Response filed Jun. 1, 2021 to Non Final Office Action dated Mar. 29, 2021", 12 pgs.

"U.S. Appl. No. 16/376,453, Corrected Notice of Allowability dated Dec. 8, 2020", 8 pgs.

"U.S. Appl. No. 16/376,453, Examiner Interview Summary dated Oct. 6, 2020", 3 pgs.

"U.S. Appl. No. 16/376,453, Final Office Action dated Aug. 31, 2020", 19 pgs.

"U.S. Appl. No. 16/376,453, Notice of Allowance dated Oct. 28, 2020", 11 pgs.

"U.S. Appl. No. 16/376,453, Response filed Oct. 6, 2020 to Final Office Action dated Aug. 31, 2020", 8 pgs.

* cited by examiner

USER TABLE (310)

| USER ID | TENANT ID | PERMISSIONS |
|---|---|---|
| 1 | 1 | USER READ-ONLY, TENANT READ-ONLY |
| 2 | 2 | USER ALL, TENANT READ-ONLY |
| 3 | 2 | USER ALL, TENANT ALL |
| 4 | 3 | USER ALL, TENANT READ-ONLY |

STRATEGY TABLE (340)

| STRATEGY ID | LAYER ID | LAYER ORDER |
|---|---|---|
| 1 | 1 | 1 |
| 1 | 2 | 2 |
| 2 | 2 | 1 |
| 2 | 3 | 2 |

TENANT TABLE (370)

| TENANT ID | STRATEGY ID |
|---|---|
| 1 | 1 |
| 2 | 2 |
| 3 | 3 |
| 4 | 4 |

| DEPENDENCY TABLE (410) | |
|---|---|
| LAYER ID (420) | DEPENDENCY LIST |
| 1 (430A) | 2 |
| 2 (430B) | NULL |
| 3 (430C) | NULL |

| FILE TABLE (440) | |
|---|---|
| LAYER ID (450) | FILE NAME |
| 5 (460A) | /WORK/REPORT.DOC |
| 1 (460B) | /DOCUMENTS/BUDGET.XLS |
| 2 (460C) | /DOCUMENTS/BUDGET.XLS |

*FIG. 4*

MULTITENANCY USING AN OVERLAY FILE SYSTEM

TECHNICAL FIELD

The subject matter disclosed herein generally relates to overlay file systems. Specifically, the present disclosure addresses systems and methods to realize multitenancy using an overlay file system.

BACKGROUND

An overlay file system provides a logical file system that merges two or more physical file systems. Any files that are present in exactly one of the merged file systems are presented unchanged in the resulting logical file system. For files that are presented in more than one of the merged file systems, one of the files is selected by the overlay file system to be presented in the logical file system.

An artifact is a file, such as a Java archive (JAR) file, that includes one or more files for an application. The files within the artifact may be source files, executable files, and description files. A software package comprises one or more artifacts. The source files and executable files of the artifacts are used to execute the software package itself. A description file includes information about the artifact, including dependencies of the artifact. A first artifact is dependent on a second artifact if the first artifact requires the second artifact in order to be used.

Multitenancy is a software architecture in which multiple instances of a software application operate in a shared environment. The instances are logically separated.

BRIEF DESCRIPTION OF THE DRAWINGS

Some embodiments are illustrated by way of example and not limitation in the figures of the accompanying drawings.

FIGS. 3-4 are block diagrams of a database schema suitable for use in implementing multitenancy using an overlay file system, according to some example embodiments.

DETAILED DESCRIPTION

Example methods and systems are directed to multitenancy using an overlay file system. Each tenant has one or more users and a tenant layer in the overlay file system. Each user has a user layer in the overlay file system. The overlay file system provides a logical file system to each user based on the user layer, the tenant layer, and a strategy comprising a set of application layers.

A first user shares a file with other users of the same tenant by moving the file from the first user's user layer to the tenant layer. After the file is moved, all users of the tenant have access to the file. The moving of the file is achieved by modifying metadata for the file.

By comparison with existing methods of sharing files among users of a single tenant, the methods and systems discussed herein improve efficiency by avoiding copying of data. Updating the metadata for a file is a faster operation than copying the file from a user area to a tenant area. Accordingly, the performance of the application server is improved. Furthermore, processor cycles involved in file copying are saved. Furthermore, by comparison with prior art solutions in which files are shared by duplication (e.g., by placing the files in multiple user areas instead of in a single tenant area), storage resources are saved.

Figure 1:
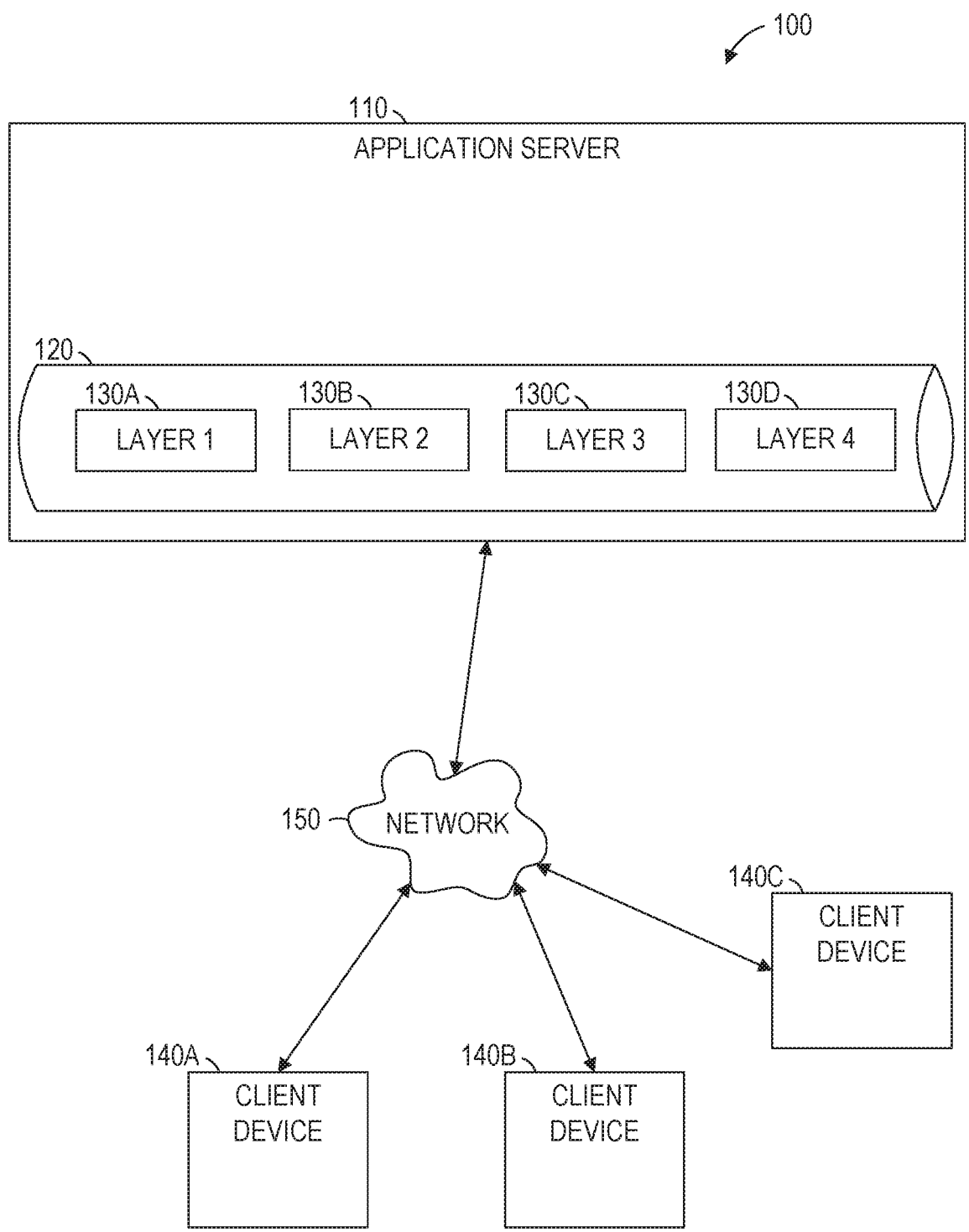
FIG. 1 is a network diagram illustrating a network environment suitable for multitenancy using an overlay file system, according to some example embodiments.

FIG. 1 is a network diagram illustrating a network environment 100 suitable for multitenancy using an overlay file system, according to some example embodiments. The network environment 100 includes an application server 110, client devices 140A, 140B, and 140C, and a network 150. The application server 110 accesses application layers 130A, 130B, 130C, and 130D of an overlay file system stored on a storage device 120 to provide data access to logical file systems to the client devices 140A-140C. The application server 110 and the client devices 140A, 140B, and 140C may each be implemented in a computer system, in whole or in part, as described below with respect to FIG. 10. The client devices 140A, 140B, and 140C may be referred to collectively as client devices 140 or generically as a client device 140.

The client device 140 may provide identifying information to the application server 110, and the identifying information may be used by the application server 110 to determine how to interpret which of the application layers 130A-130D to combine in providing a logical file system to the client device 140.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 110 and the client devices 140A-140C are connected by the network 150. The network 150 may be any network that enables communication between or among machines, databases, and devices. Accordingly, the network 150 may be a wired network, a wireless network (e.g., a mobile or cellular network), or any suitable combination thereof. The network 150 may include one or more portions that constitute a private network, a public network (e.g., the Internet), or any suitable combination thereof.

Figure 2:
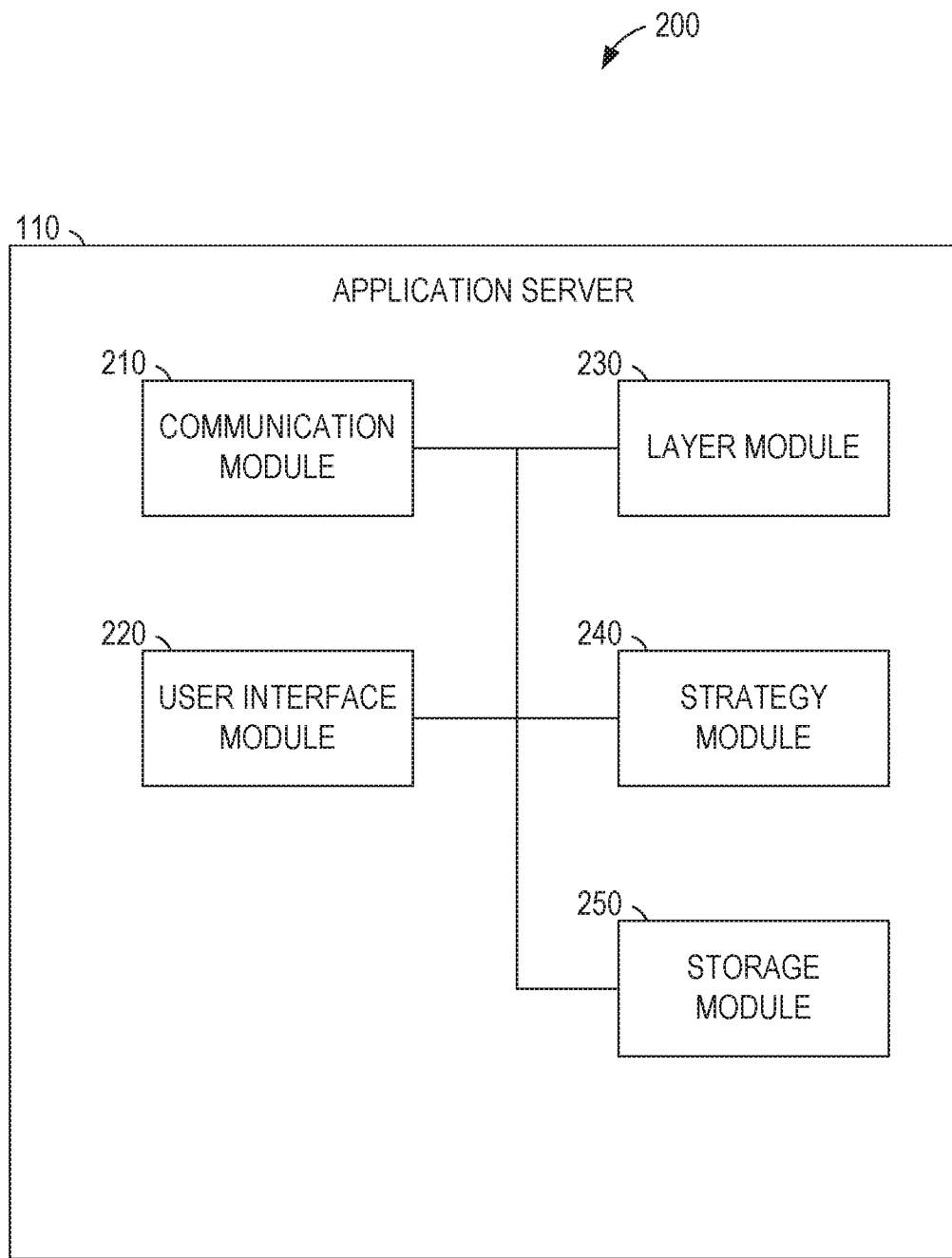
FIG. 2 is a block diagram of an application server, according to some example embodiments, suitable for multitenancy using an overlay file system.

FIG. 2 is a block diagram 200 of the application server 110, according to some example embodiments, suitable for multitenancy using an overlay file system. The application server 110 is shown as including a communication module 210, a user interface module 220, a layer module 230, a strategy module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the application server 110 and transmits data from the application server 110. For example, the communication module 210 may receive, from the client device 140A, a request to share a file stored on a first layer of an overlay file system. The request to share the file is a request to share the file with other client devices 140 of the same tenant and the first layer is a layer accessible by the client device 140A but not to other client devices 140 of the same tenant. The communication module 210 provides the request to the layer module 230. The layer module 230 updates metadata for the file to move the file to a layer corresponding to the tenant. Communications sent and received by the communication module 210 may be intermediated by the network 150.

The user interface module 220 causes presentation of a user interface for the application server 110 on a display associated with the client device 140A, 140B, or 140C. The user interface allows a user to select a file from a list of files, to interact with an application, or any suitable combination thereof.

FIGS. 3-4 are block diagrams of a database schema 300 suitable for use in implementing multitenancy using an overlay file system, according to some example embodiments. The database schema 300 includes a user table 310, a strategy table 340, a tenant table 370, a dependency table 410, and a file table 440. The user table 310 includes rows 330A, 330B, 330C, and 330D of a format 320. The strategy table 340 includes rows 360A, 360B, 360C, and 360D of a format 350. The tenant table 370 includes rows 390A, 390B, 390C, and 390D of a format 380. The dependency table 410 includes rows 430A, 430B, and 430C of a format 420. The file table 440 includes rows 460A, 460B, and 460C of a format 450.

Each of the rows 330A-330D of the user table 310 includes a user identifier, a tenant identifier, and permissions. The user identifier is a unique identifier of the user. The tenant identifier identifies the tenant of the user (e.g., the business entity that is a customer of the business providing the application server 110). The permissions indicate whether the user has read-only access or all rights (e.g., read-write access) to their own files and to tenant-level files. Using the overlay file system, each user will see a file system comprising files from layers of the strategy of the tenant plus user-specific files.

The layers used in the strategies are identified in the rows 360A-360D of the strategy table 340. Each row includes a strategy identifier, a layer identifier, and a layer order. The rows 360A and 360B together indicate that, for strategy 1, layer 1 is the top layer and layer 2 is a lower layer. The rows 360C and 360D together indicate that, for strategy 2, layer 2 is the top layer and layer 3 is a lower later.

The relationship between the strategies defined in the strategy table 340 and the tenants are defined in the tenant table 370. Each of the rows 390A-390D relates a tenant identifier to a strategy identifier. Thus, when a user connects to the application server 110 using a user identifier, cross-referencing of the tenant identifier in the user table 310 with the tenant identifier in the tenant table 370 identifies the strategy for the user and reference to the strategy table 340 enables the overlay file system to determine the strategy to be used in providing the logical file system to the user.

Each row 430A-430C of the dependency table 410 includes a layer identifier and a dependency list. The dependency list indicates which layers the identified layer is dependent on. Thus, the row 430A indicates that the application on layer 1 is dependent on the application on layer 2. Thus, if a user installs the application on layer 1, adding layer 1 to their strategy, the application server 110 is enabled to automatically add layer 2 to the strategy as well. In this way, applications are (logically) installed with their dependencies, and are able to function without the user being required to install the dependencies manually.

The file table 440 provides name, including a full path, for each file and identifies the layer on which the file is stored. The overlay file system refers to the layer identifier of each file in constructing the logical file system according to the layer strategy of a user account. Thus, by changing the layer identifier for a file in the file table 440, the logical file system is updated for user accounts using the original layer identifier, the changed layer identifier, or both. A user interface may display a list of human-readable file names and layer identifiers to enable a user to select a file to move, select the layer to move the file to, or both.

Figure 5:
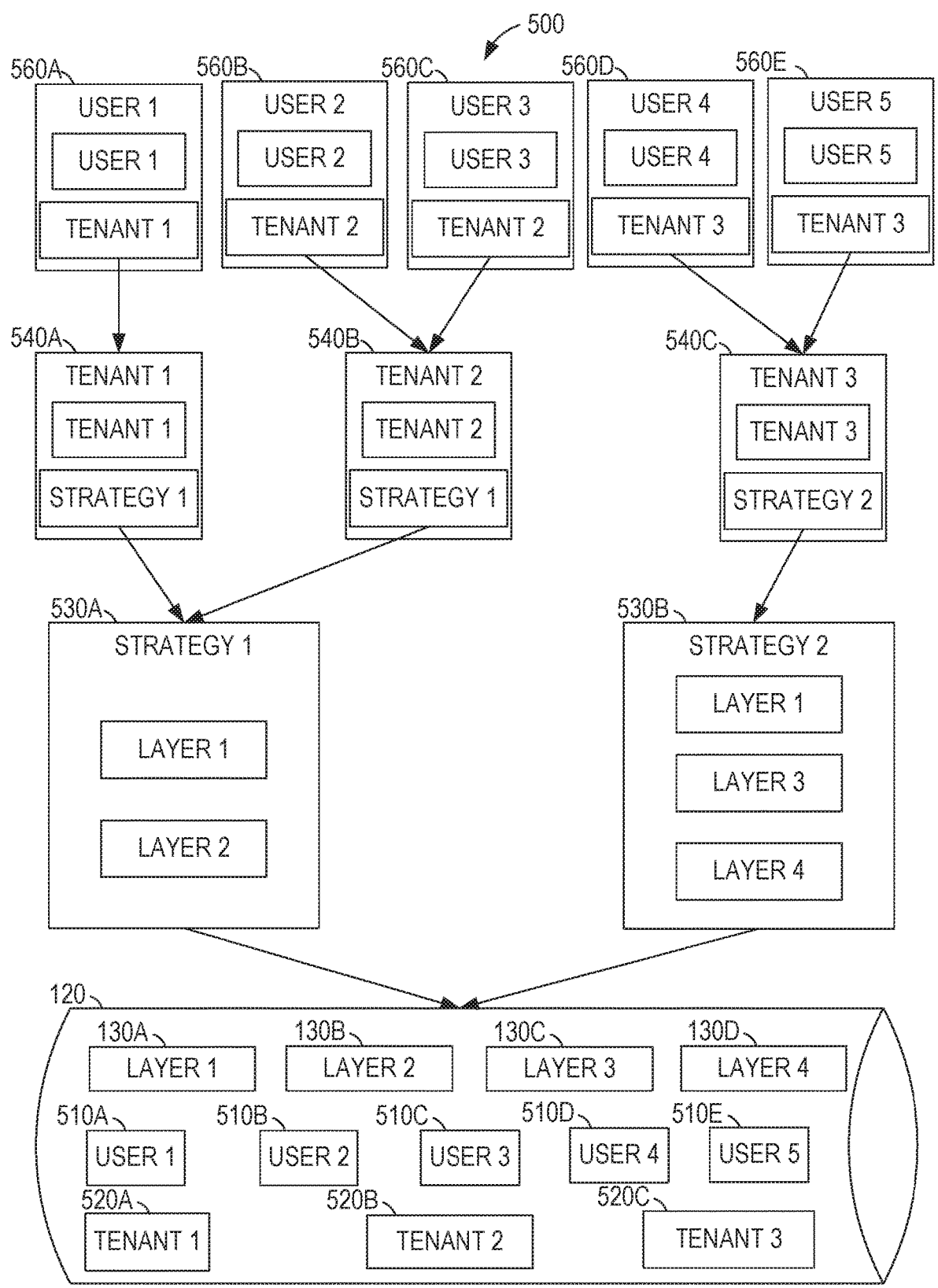
FIG. 5 is an illustration of an overlay file system with two strategies for accessing layers in implementing multitenancy using an overlay file system, according to some example embodiments.

FIG. 5 is an illustration 500 of an overlay file system with two strategies for accessing layers in implementing software installation through an overlay file system, according to some example embodiments. The storage device 120 contains application layers 130A-130D; user layers 510A, 510B, 510C, 510D, and 510E; and tenant layers 520A, 520B, and 520C. The strategy 530A includes references to the application layers 130A and 130B. The overlay file system creates a logical file system using the strategy 530A to provide access to the files of the application layers 130A and 130B without duplicating the stored data of the referenced layers. Similarly, the strategy 530B includes references to the application layers 130A, 130C, and 130D. The overlay file system creates a logical file system using the strategy 530B to provide access to the files of the application layers 130A, 130C, and 130D without duplicating the stored data of the layers. In some example embodiments, the application layers 130A-130D store read-only files for applications. Thus, each of the strategies 530A-530B provides a logical file system that contains read-only application files.

Each of the tenant views 540A, 540B, and 540C includes a reference to one of the tenant layers 520A-520C and one of the strategies 530A-530B. One tenant view is created for each tenant of the application server 110. Using a tenant view, the overlay file system provides a logical file system in which a tenant layer 520 is overlaid on the logical file system for the underlying strategy. Thus, in the tenant view 540A, the tenant layer 520A is played over the strategy 530A. Since the strategy 530A comprises the application layer 130A over the application layer 130B, the set of layers for the tenant view 540A is the tenant layer 520A, the application 130A, and the application layer 130B. Other examples are shown for the tenant views 540B and 540C.

Each of the user views 560A, 560B, 560C, 560D, and 560E includes a reference to one of the user layers 510A-510E and one of the tenant views 540A-540C. One user view is created for each user of the application server 110. Using a user view, the overlay file system provides a logical file system in which a user layer 510 is overlaid on the logical file system for the underlying tenant. Thus, in the user view 560A, the user layer 510A is played over the tenant view 540A. Since the tenant view 540A comprises tenant layer 520A over the strategy 530A and the strategy 530A comprises the application layer 130A over the application layer 130B, the set of layers for the user view 560A is the user layer 510A, the tenant layer 520A, the application 130A, and the application layer 130B. Other examples are shown for the user views 560B-560E.

In some example embodiments, each user has read-write access to the corresponding user layer 510, configurable access to the corresponding tenant layer 520 (e.g., using the permissions field of the user table 310 of FIG. 3), and read-only access to the corresponding strategy. Thus, the layers that are shared between tenants cannot be modified by any tenant, each tenant layer 520 is controlled by the tenant, and each user layer 510 is controlled by the user. The files in each tenant layer 520 are unavailable to other tenants and their users. The files in each user layer 510 are unavailable to other users.

Since each layer is stored only once in the file system, substantial space savings result in comparison with prior art solutions in which application files, tenant files, or both are duplicated for each user.

Figure 6:
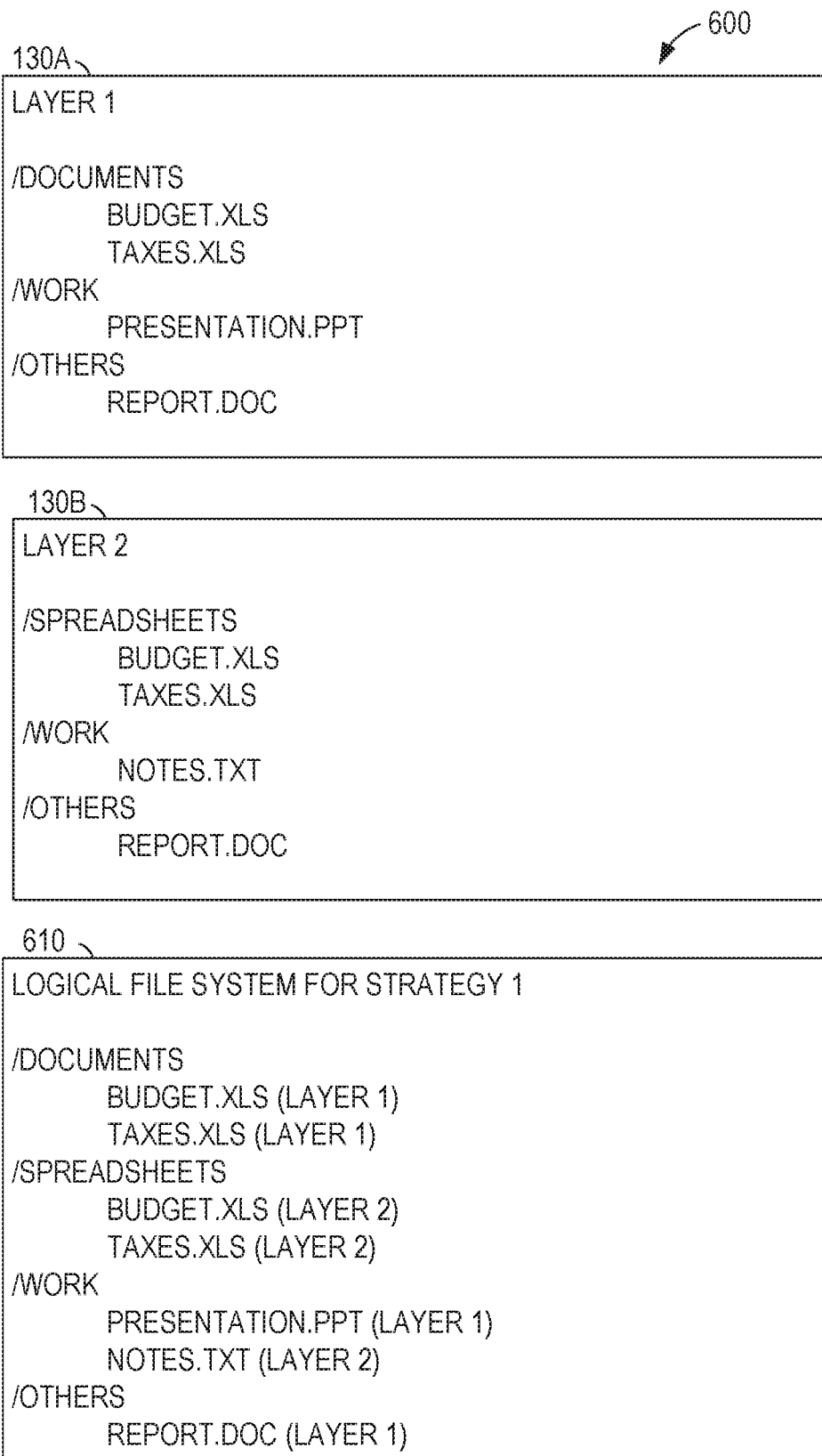
FIG. 6 is an illustration showing a logical file system for a strategy of FIG. 5, according to some example embodiments.

FIG. 6 is an illustration 600 showing the logical file system 610 for the strategy 530A of FIG. 5, according to some example embodiments. Details of the application layer 130A are shown, including four files stored in three directories. Details of the application layer 130B are also shown, also including four files stored in three directories, with only the /others/report.doc file being the same in both layers. The logical file system 610 includes the six distinct files from the two layers and the report.doc file from the application layer 130A. As shown in FIG. 5, the application layer 130A is a higher layer than the application layer 130B. The overlay file system resolves conflicts in favor of the higher layer. Accordingly, in the logical file system 610, the report.doc file from the application layer 130A is made available to users of the strategy 530A and the report.doc file from the application layer 130B is hidden.

Figure 7:
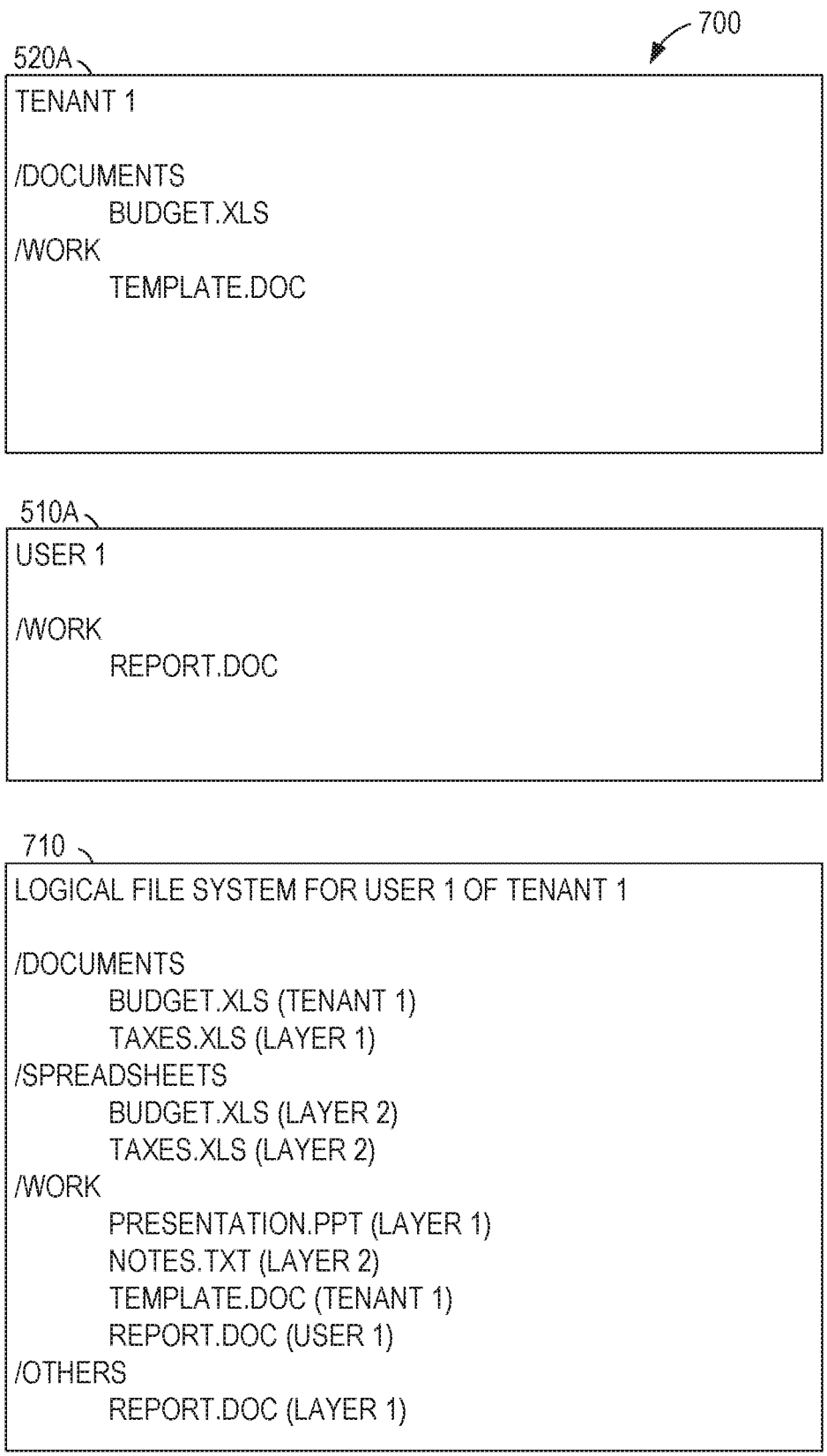
FIG. 7 is an illustration with additional details of a logical file system for a user of FIG. 5, according to some example embodiments.

FIG. 7 is an illustration with additional details of a logical file system 710 for the user view 560A of FIG. 5, according to some example embodiments. Details of the tenant layer 520A are shown, including two files stored in two directories. Details of the user layer 510A are also shown, including one file stored in one directory. In accordance with the tenant view 540A and the user view 560A, the logical file system 710 overlays the user layer 510A over the tenant layer 520A over the logical file system 610 for the strategy 530A. Accordingly, the budget.xls file from the tenant layer 520A is included in the logical file system 710, hiding the budget.xls of the logical file system 610.

Figure 8:
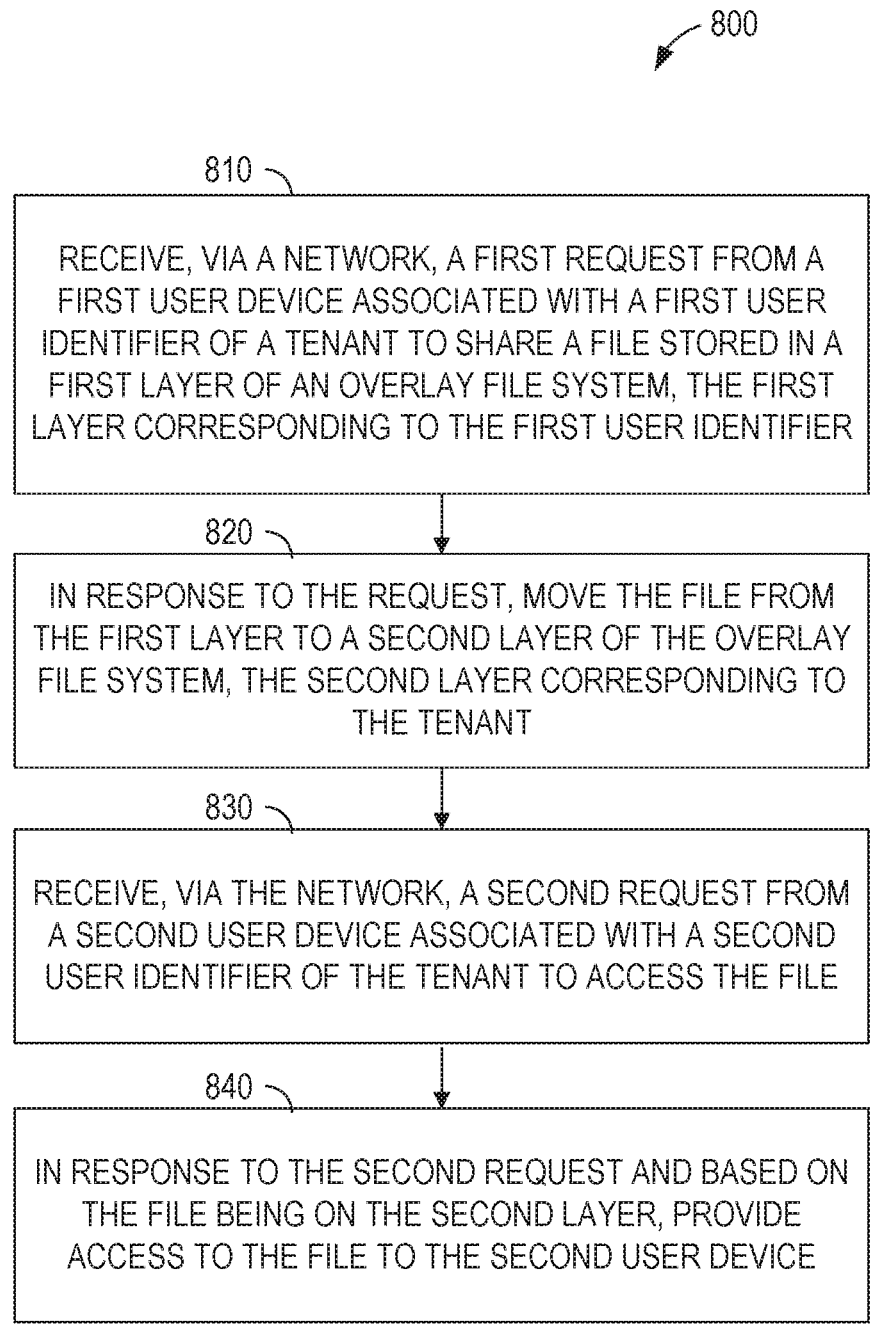
FIG. 8 is a flowchart illustrating operations of a method suitable for manipulating a tenant layer of an overlay file system, according to some example embodiments, according to some example embodiments.

FIG. 8 is a flowchart illustrating operations of a method 800 suitable for manipulating a tenant layer 520 of an overlay file system, according to some example embodiments. The method 800 includes operations 810, 820, 830, and 840. By way of example and not limitation, the method 800 is described as being performed by the devices, modules, and databases of FIGS. 1-7.

In operation 810, the strategy module 240 receives, via a network 150, a first request from a first user device associated with a first user identifier of a tenant to share a file stored in a first layer of an overlay file system of a storage device, the first layer corresponding to the first user identifier. For example, a user logs in using the user device 140A by providing credentials corresponding to the row 330B of the user table 310, associating the device 140A with the user identifier 2. The user device 140A transmits a request via the network 150 to share a file stored in the layer 510B of FIG. 5, corresponding to the first user identifier.

In operation 820, in response to the first request, the layer module 230 moves the file from the first layer to a second layer of the overlay files system, the second layer corresponding to the tenant. In this example, the file is moved from the layer 510B to the layer 520B, corresponding to the tenant.

The strategy module 240 receives, via the network 150, a second request from a second user device associated with a second user identifier of the tenant to access the file (operation 830). Continuing with this example, another user logs in using the user device 140B by providing credentials corresponding to the row 330C of the user table 310, associating the user device 140B with the user identifier 3. the user identified in the row 330C of the user table 310 attempts to access the file. The request is made from the client device 140B via the network 150, as shown in FIG. 1.

In operation 840, the strategy module 240, in response to the second request and based on the file being on the second layer, provides access to the file to the second user. In this example, the strategy module 240 determines that the file is part of the overlay file system for the second user because the file is on the layer for the tenant of the second user.

Figure 9:
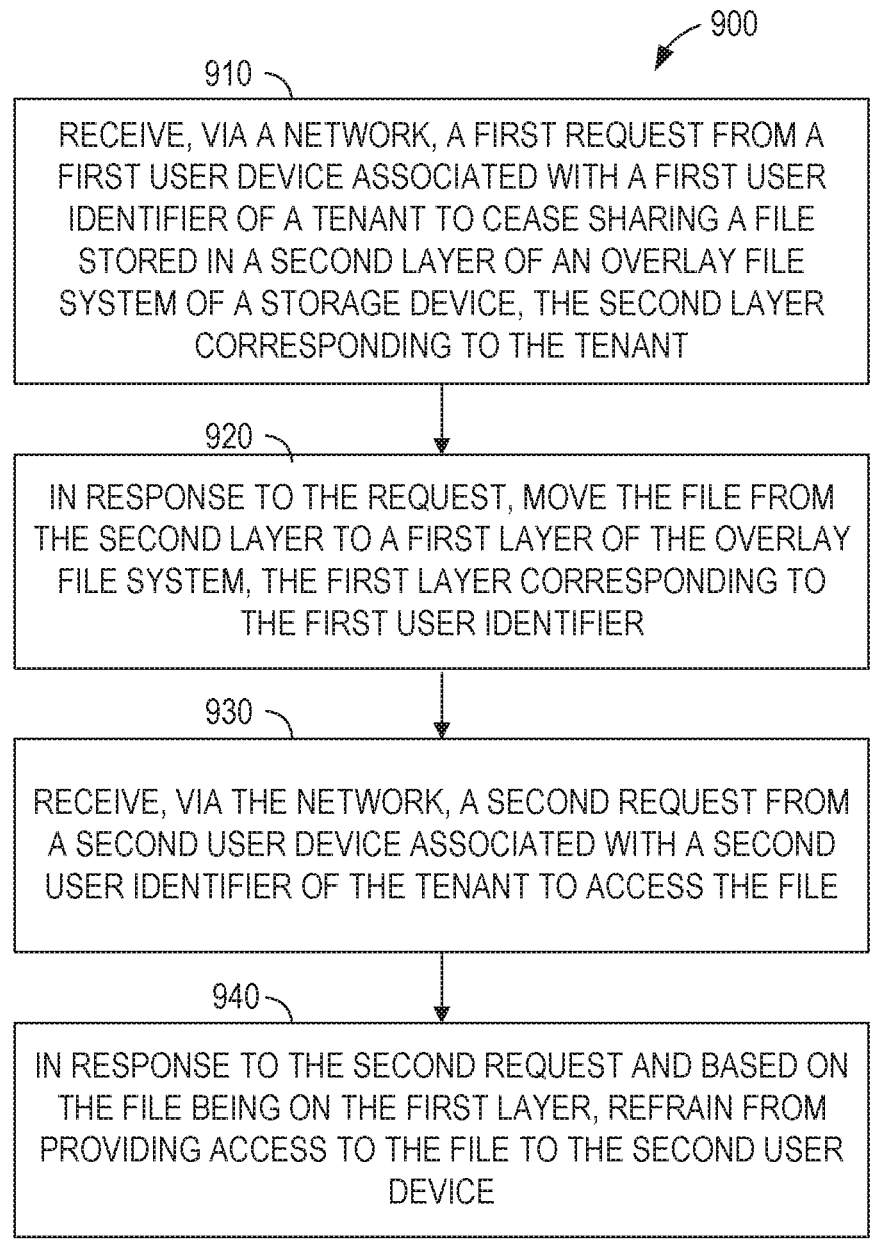
FIG. 9 is a flowchart illustrating operations of a method suitable for manipulating a tenant layer of an overlay file system, according to some example embodiments, according to some example embodiments.

FIG. 9 is a flowchart illustrating operations of a method 900 suitable for manipulating a tenant layer 520 of an overlay file system, according to some example embodiments. The method 900 includes operations 910, 920, 930, and 940. By way of example and not limitation, the method 900 is described as being performed by the devices, modules, and databases of FIGS. 1-7.

In operation 910, the strategy module 240 receives, via a network 150, a first request from a first user device associated with a first user identifier of a tenant to cease sharing a file stored in a second layer of an overlay file system, the second layer corresponding to the tenant. For example, a user device associated with the user identified in the row 330C of the user table 310 requests to cease sharing a file stored in the layer 520B of FIG. 5, corresponding to the tenant of the user identifier. The request is made from the client device 140A via the network 150, as shown in FIG. 1.

In operation 920, in response to the first request, the layer module 230 moves the file from the second layer to a first layer of the overlay file system, the first layer corresponding to the first user identifier. In this example, the file is moved from the layer 520B to the layer 510B, corresponding to the first user identifier. In some example embodiments, user permissions are checked to determine if the first user identifier has permission to modify the second layer. In this example, since the user identified in the row 330C has "user all" and "tenant all" permissions, operation 920 is performed. If the user identifier did not have permissions to modify the second layer, an informative message would be displayed and the method 900 would terminate.

The strategy module 240 receives, via the network 150, a second request from a second user device associated with a second user identifier of the tenant to access the file (operation 930). Continuing with this example, a user device associated with the user identified in the row 330B of the user table 310 attempts to access the file. The request is made from the client device 140B via the network 150, as shown in FIG. 1.

In operation 940, the strategy module 240, in response to the second request and based on the file being on the first layer, refrains from providing access to the file to the second user device. In this example, the strategy module 240 determines that the file is not part of the overlay file system for the second user identifier because the file is not on any layer accessible by the second user (in this example, because the file is on the layer for the first user identifier and the layer for the first user identifier is not accessible by the second user identifier).

Thus, the method 900 is the inverse of the method 800. By use of the methods 800 and 900, access to files for users of a tenant can be controlled. In example embodiments that move files from one layer to another by changing an attribute of the file instead of copying the data of the file, performance is improved over prior art file systems that spend processor cycles and storage device access time moving or duplicating data. For example, the layer identifier in the file table 440 may be updated for the file to move the file from one layer to another without copying the file's data.

EXAMPLES

Example 1

A method comprising:
receiving, via a network, a first request from a first user device associated with a first user identifier of a tenant to share a file stored in a first layer of an overlay file system of a storage device, the first layer corresponding to the first user identifier;
in response to the first request, moving, by one or more hardware processors, the file from the first layer to a second layer of the overlay file system of the storage device, the second layer corresponding to the tenant;
receiving, via the network, a second request from a second user device associated with a second user identifier of the tenant to access the file; and
in response to the second request and based on the file being on the second layer, providing access to the file to the second user device.

Example 2

The method of example 1, wherein the moving of the file from the first layer to a second layer comprises updating an attribute of the file.

Example 3

The method of example 1 or example 2, wherein the moving of the file from the first layer to the second layer does not include copying data of the file.

Example 4

The method of any of examples 1 to 3, wherein the first user identifier has read-write access to the first layer and read-only access to a third layer of the overlay file system.

Example 5

The method of any of examples 1 to 4, wherein the second layer is unavailable to a third user device associated with a third user identifier of a second tenant.

Example 6

The method of any of examples 1 to 5, wherein the first layer is unavailable to the second user device associated with the second user identifier.

Example 7

The method of any of examples 1 to 6, further comprising:
receiving a third request from the first user device to cease sharing the file stored in the second layer; and
in response to the third request, moving the file from the second layer to the first layer.

Example 8

The method of example 7, wherein:
the moving of the file from the second layer to the first layer is further based on the first user identifier having a permission to modify the second layer.

Example 9

A system comprising
a memory that stores instructions; and
one or more processors configured by the instructions to perform operations comprising:
receiving, via a network, a first request from a first user device associated with a first user identifier of a tenant to share a file stored in a first layer of an overlay file system of a storage device, the first layer corresponding to the first user identifier;
in response to the first request, moving the file from the first layer to a second layer of the overlay file system of the storage device, the second layer corresponding to the tenant;
receiving, via the network, a second request from a second user device associated with a second user identifier of the tenant to access the file; and
in response to the second request and based on the file being on the second layer, providing access to the file to the second user device.

Example 10

The system of example 9, wherein the moving of the file from the first layer to a second layer comprises updating an attribute of the file.

Example 11

The system of example 9 or example 10, wherein the moving of the file from the first layer to the second layer does not include copying data of the file.

Example 12

The system of any of examples 9 to 11, wherein the first user identifier has read-write access to the first layer and read-only access to a third layer of the overlay file system.

Example 13

The system of any of examples 9 to 12, wherein the second layer is unavailable to a third user device associated with a third user identifier of a second tenant.

Example 14

The system of any of examples 9 to 13, wherein the first layer is unavailable to the second user device.

Example 15

The system of any of examples 9 to 14, wherein the operations further comprise:
receiving a third request from the first user device to cease sharing the file stored in the second layer; and
in response to the third request, moving the file from the second layer to the first layer.

Example 16

The system of example 15, wherein:
the moving of the file from the second layer to the first layer is further based on the first user identifier having a permission to modify the second layer.

Example 17

A non-transitory computer-readable medium that stores instructions that, when executed by one or more processors, cause the one or more processors to perform operations comprising:
receiving, via a network, a first request from a first user device associated with a first identifier of a tenant to share a file stored in a first layer of an overlay file system, the first layer corresponding to the first user identifier;
in response to the first request, moving the file from the first layer to a second layer of the overlay file system, the second layer corresponding to the tenant;
receiving, via the network, a second request from a second user device associated with a second user identifier of the tenant to access the file; and
in response to the second request and based on the file being on the second layer, providing access to the file to the second user device.

Example 18

The computer-readable medium of example 17, wherein the moving of the file from the first layer to a second layer comprises updating an attribute of the file.

Example 19

The computer-readable medium of example 17 or example 18, wherein the moving of the file from the first layer to the second layer does not include copying data of the file.

Example 20

The computer-readable medium of any of examples 17 to 19, wherein the first user identifier has read-write access to the first layer and read-only access to a third layer of the overlay file system.

Figure 10:
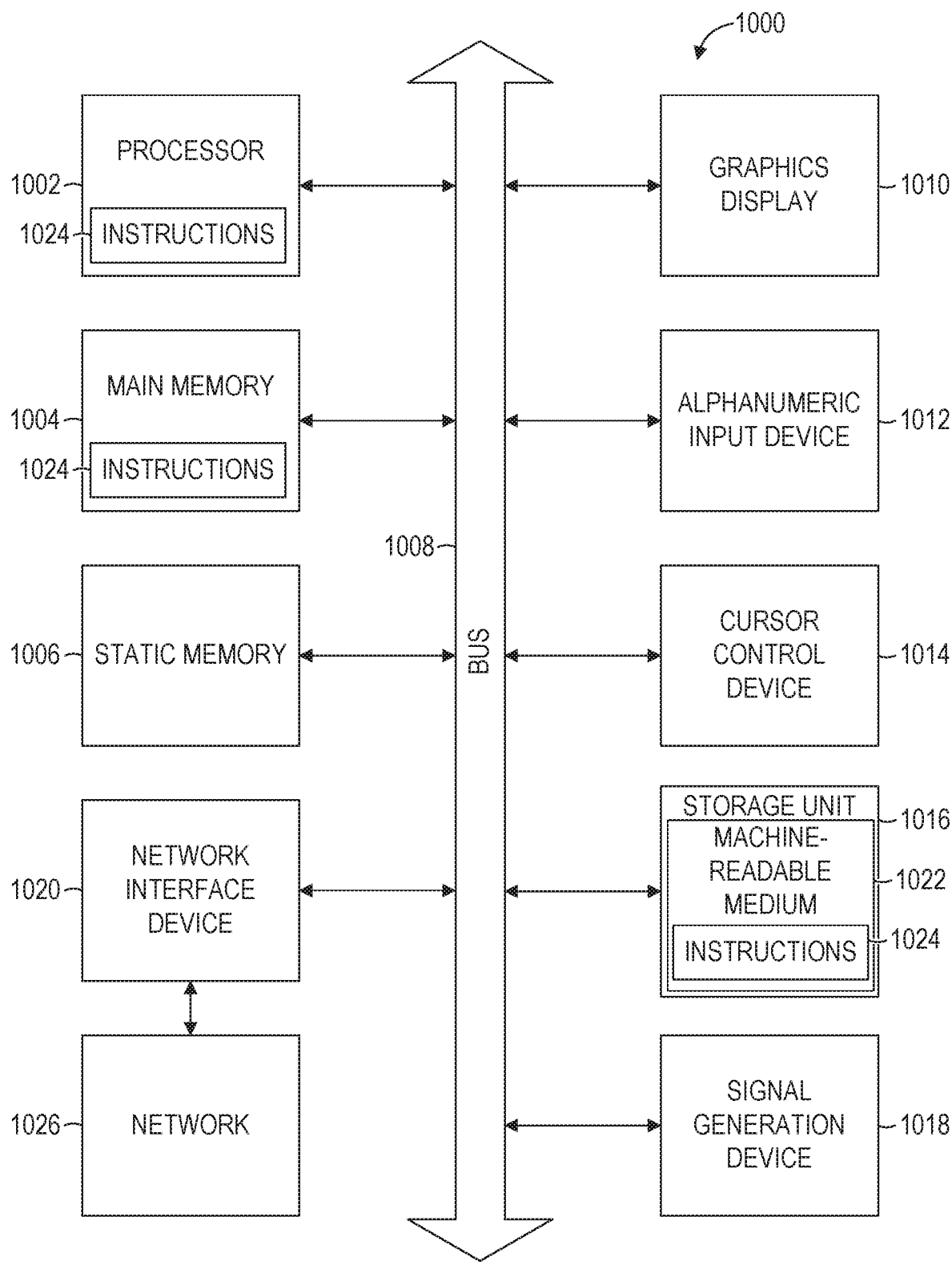
FIG. 10 is a block diagram illustrating components of a machine, according to some example embodiments.

FIG. 10 is a block diagram illustrating components of a machine 1000, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 10 shows a diagrammatic representation of the machine 1000 in the example form of a computer system within which instructions 1024 (e.g., software, a program, an application, an applet, an app, or other executable code) for causing the machine 1000 to perform any one or more of the methodologies discussed herein may be executed, in whole or in part. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include a collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a graphics display 1010 (e.g., a plasma display panel (PDP), a light-emitting diode (LED) display, a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or another pointing instrument), a storage unit 1016, a signal generation device 1018 (e.g., a speaker), and a network interface device 1020.

The storage unit 1016 includes a machine-readable medium 1022 on which are stored the instructions 1024 embodying any one or more of the methodologies or functions described herein. The instructions 1024 may also reside, completely or at least partially, within the main memory 1004, within the processor 1002 (e.g., within the processor's cache memory), or both, during execution thereof by the machine 1000. Accordingly, the main memory 1004 and the processor 1002 may be considered as machine-readable media. The instructions 1024 may be transmitted or received over a network 1026 via the network interface device 1020.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown, in an example embodiment, to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., the machine 1000), such that the instructions, when executed by one or more processors of the machine (e.g., the processor 1002), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instant in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instant of time and to constitute a different hardware module at a different instant of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
receiving, via a network, a first request from a first user device associated with a first user identifier of a tenant to share a file stored in a first layer of an overlay file system of a storage device, the first layer corresponding to the first user identifier;
in response to the first request, moving, by one or more hardware processors, the file from the first layer to a second layer of the overlay file system of the storage device, the second layer corresponding to the tenant;
receiving, via the network, a second request from a second user device associated with a second user identifier of the tenant to modify the file;
accessing, from a database, permissions of the second user identifier for the second layer;
in response to the second request, based on the file being on the second layer and the permissions of the second user identifier for the second layer, allowing the second request to modify the file;
receiving, via the network, a third request from a third user device associated with a third user identifier of the tenant to modify the file;
accessing, from the database, permissions of the third user identifier for the second layer; and
in response to the third request, based on the file being on the second layer and the permissions of the third user identifier for the second layer, denying the third request to modify the file.

2. The method of claim 1, wherein the moving of the file from the first layer to the second layer comprises updating an attribute of the file.

3. The method of claim 1, wherein the moving of the file from the first layer to the second layer does not include copying data of the file.

4. The method of claim 1, wherein the first user identifier has read-write access to the first layer and read-only access to a third layer of the overlay file system.

5. The method of claim 1, wherein the second layer is unavailable to a fourth user device associated with a fourth user identifier of a second tenant.

6. The method of claim 1, wherein the first layer is unavailable to the second user device associated with the second user identifier.

7. The method of claim 1, further comprising:
receiving a fourth request from the first user device to cease sharing the file stored in the second layer; and
in response to the fourth request, moving the file from the second layer to the first layer.

8. A system comprising:
a memory that stores instructions; and
one or more processors configured by the instructions to perform operations comprising:
receiving, via a network, a first request from a first user device associated with a first user identifier of a tenant to share a file stored in a first layer of an overlay file system of a storage device, the first layer corresponding to the first user identifier;
in response to the first request, moving the file from the first layer to a second layer of the overlay file system of the storage device, the second layer corresponding to the tenant;
receiving, via the network, a second request from a second user device associated with a second user identifier of the tenant to modify the file;
accessing, from a database, permissions of the second user identifier for the second layer;
in response to the second request, based on the file being on the second layer and the permissions of the second user identifier for the second layer, allowing the second request to modify the file;
receiving, via the network, a third request from a third user device associated with a third user identifier of the tenant to modify the file;
accessing, from the database, permissions of the third user identifier for the second layer; and
in response to the third request, based on the file being on the second layer and the permissions of the third user identifier for the second layer, denying the third request to modify the file.

9. The system of claim 8, wherein the moving of the file from the first layer to the second layer comprises updating an attribute of the file.

10. The system of claim 8, wherein the moving of the file from the first layer to the second layer does not include copying data of the file.

11. The system of claim 8, wherein the first user identifier has read-write access to the first layer and read-only access to a third layer of the overlay file system.

12. The system of claim 8, wherein the second layer is unavailable to a fourth user device associated with a fourth user identifier of a second tenant.

13. The system of claim 8, wherein the first layer is unavailable to the second user device.

14. The system of claim 8, wherein the operations further comprise:
receiving a fourth request from the first user device to cease sharing the file stored in the second layer; and
in response to the fourth request, moving the file from the second layer to the first layer.

15. The system of claim 14, wherein:
the moving of the file from the second layer to the first layer is further based on the first user identifier having a permission to modify the second layer.

16. A non-transitory computer-readable medium that stores instructions that, when executed by one or more processors, cause the one or more processors to perform operations comprising:
receiving, via a network, a first request from a first user device associated with a first user identifier of a tenant to share a file stored in a first layer of an overlay file system, the first layer corresponding to the first user identifier;
in response to the first request, moving the file from the first layer to a second layer of the overlay file system, the second layer corresponding to the tenant;
receiving, via the network, a second request from a second user device associated with a second user identifier of the tenant to modify the file;
accessing, from a database, permissions of the second user identifier for the second layer;
in response to the second request, based on the file being on the second layer and the permissions of the second user identifier for the second layer, allowing the second request to modify the file;
receiving, via the network, a third request from a third user device associated with a third user identifier of the tenant to modify the file;
accessing, from the database, permissions of the third user identifier for the second layer; and
in response to the third request, based on the file being on the second layer and the permissions of the third user identifier for the second layer, denying the third request to modify the file.

17. The computer-readable medium of claim 16, wherein the moving of the file from the first layer to the second layer comprises updating an attribute of the file.

18. The computer-readable medium of claim 16, wherein the moving of the file from the first layer to the second layer does not include copying data of the file.

19. The computer-readable medium of claim 16, wherein the first user identifier has read-write access to the first layer and read-only access to a third layer of the overlay file system.

20. The method of claim 1, further comprising:
accessing, from the database, based on the tenant, a layer strategy that identifies a plurality of layers and relationships among the plurality of layers; and
providing a logical file system in accordance with the layer strategy to the first user device.

* * * * *